United States Patent [19]

Schlink

[11] Patent Number: 5,353,064
[45] Date of Patent: Oct. 4, 1994

[54] MULTIPAGE TELETEXT DECODER FOR CAPTURING A REQUESTED PAGE DURING A SINGLE CYCLE

[75] Inventor: Renee Schlink, Eindhoven, Netherlands

[73] Assignee: U.S. Philips Corporation, New York, N.Y.

[21] Appl. No.: 991,038

[22] Filed: Dec. 15, 1992

[30] Foreign Application Priority Data

Dec. 18, 1991 [EP] European Pat. Off. ........ 91203341.2

[51] Int. Cl.⁵ .................... H04N 7/087; H04N 7/08
[52] U.S. Cl. .................... 348/468; 348/464; 348/461
[58] Field of Search ............. 358/147, 142, 146, 86; H04N 7/087, 7/08

[56] References Cited

U.S. PATENT DOCUMENTS

| | | | |
|---|---|---|---|
| 4,769,083 | 7/1987 | Schmitz et al. | 358/147 |
| 4,908,706 | 3/1990 | Bugg | 358/147 |
| 4,991,017 | 2/1991 | Raaijmahers | 358/147 |
| 5,208,671 | 5/1993 | Tarrant | 358/147 |
| 5,237,411 | 8/1993 | Fink et al. | 358/147 |

FOREIGN PATENT DOCUMENTS

| | | | |
|---|---|---|---|
| 0406972 | 1/1991 | European Pat. Off. | H04N 7/087 |
| 3622308 | 7/1988 | Fed. Rep. of Germany | H04N 7/087 |
| 2231470 | 11/1990 | United Kingdom | H04N 7/087 |

OTHER PUBLICATIONS

"New Multipage Teletext Decoders" IEEE Transactions on Consumer Electronics vol. 37, No. 3, Aug. 1991 pp. 441–448.

*Primary Examiner*—James J. Groody
*Assistant Examiner*—Safet Metjahic
*Attorney, Agent, or Firm*—David Schreiber

[57] ABSTRACT

A multipage teletext decoder is to capture, store and refresh a plurality of teletext pages as rapidly as possible. The number of acquisition circuits for this purpose is limited so that a subsequent request number is applied as rapidly as possible to each acquisition circuit after a page has been received. However, the corresponding page may already have passed. To avoid this, the number of the next capturable page is calculated. Of the request numbers the number which is as close as possible is selected.

10 Claims, 4 Drawing Sheets

MULTIPAGE TELETEXT DECODER FOR CAPTURING A REQUESTED PAGE DURING A SINGLE CYCLE

BACKGROUND OF THE INVENTION

The invention relates to a multipage teletext decoder for capturing and storing a plurality of teletext pages. The invention also relates to a television signal receiver provided with such a multipage teletext decoder. Such a receiver may be, for example, a television set or a video recorder.

A multipage teletext decoder of the type mentioned in the opening paragraph is described in the article "New Multipage Teletext Decoders" published in IEEE Transactions on Consumer Electronics, Vol. 37, no. 3, August 1991, pp. 441–448. As described in sections 6 and 7 of this article, the teletext decoder has a page memory for storing teletext pages, at least one acquisition circuit for capturing and storing a teletext page with a supplied request number, means for fixing a plurality of request numbers of pages to be captured, and a control circuit for applying a request number to the acquisition circuit.

The request numbers constitute the page numbers of the teletext pages which are to be captured and stored. The stored pages can subsequently be consulted by the user without any waiting time. The request numbers are programmed, for example, by the user and stored in a page number memory. They may also be determined by the transmitter. This transmitter transmits for each page the numbers of the pages most likely to be chosen as the next few pages. The way in which the request numbers are determined and fixed is irrelevant to the invention.

As described in the article quoted above, the control circuit applies a new request number to the acquisition circuit when a teletext page is received and stored. In this way all requested teletext pages are successively captured and stored. The entire storage procedure is repeated each time so as to achieve that stored pages are refreshed.

Teletext pages are transmitted in a repetitive cycle. Theoretically, all requested pages can be captured and stored within one such cycle. However, one of the problems in practice is that selecting the next request number and applying it to the acquisition circuit takes a relevant period of time. More particularly, the control circuit is coupled to the acquisition circuit by means of a relatively slow serial bus. Consequently, some time will elapse between the reception of a page and the actual start of the acquisition of a subsequent requested page. This "dead time" is so long that the next page to be captured may already have passed. It will then take a full cycle before the requested page is captured. In this case the storage of all requested pages may last many cycli. As a result, it takes a long rime before all the pages are available for immediate display. Moreover, the stored pages are refreshed less frequently, with the result that a page may contain out-of-date information upon display.

Generally, teletext pages are transmitted in a neat numerical order with ascending page numbers. It is not unusual that pages are clustered in groups and that "gaps" in the page numbering occur between the groups. For example, a group of home news pages comprises the numbers 103–107 and a subsequent group of foreign news pages comprises the numbers 112–118. The above-mentioned problem does not only occur if two teletext pages having consecutive page numbers must be stored (for example, 103 and 104), but also if two pages to be captured are located at either side of a gap ( for example, 107 and 112).

The sequence of the page number may also be interrupted regularly by "interrupted sequence" pages. These are pages whose page number does not fit in the numerical sequence. It is, for example, common practice to transmit frequently consulted pages several times per cycle. Such a page is then not only transmitted at its numerically logical location in the transmission cycle, but also elsewhere in the cycle. Thus, said problem may also occur if the numbers of two pages to be captured are far apart, but appear to succeed each other immediately in the transmission cycle.

SUMMARY OF THE INVENTION

It is an object of the invention to provide a multipage teletext decoder which stores the requested teletext pages rapidly and refreshes them frequently.

To this end, the multipage teletext decoder according to the invention is characterized in that the control circuit is adapted to skip a predetermined number of page numbers after the number of a received page in a predetermined cyclic series of page numbers and to select that request number of the plurality of request numbers which is the first to succeed the skipped page numbers in the cyclic series. The request number of a page which directly or substantially directly succeeds the received page and is most likely no longer capturable in the same cycle is thereby prevented from being applied to the acquisition circuit.

The predetermined cyclic series is preferably constituted by the page numbers of the actually transmitted teletext pages in the transmitted sequence. In practice, however, the teletext pages are transmitted in a neat numerical sequence with ascending page numbers. In World System Teletext, which is the most conventional teletext system, these are the page numbers between 100 and 899. The cyclic series can thus be constituted by all transmissible page numbers in an ascending sequence. The number of skipped page numbers in the series is dependent on the previously mentioned "dead time" and may be fixed experimentally. If the dead time is 125 msec, a maximum number of 4 teletext pages is transmitted within this time. Whenever a page is received, 4 page numbers are skipped. The corresponding teletext pages can no longer be captured in the same cycle. Of the request numbers that number is selected which is the first to succeed the skipped numbers. This is most likely the request number of the next capturable teletext page. The more closely the request number succeeds the lower limit number, the more pages can be captured within the cycle. In this way it is achieved that the teletext decoder stores and refreshes as many teletext pages as possible within a cycle.

A preferred embodiment of the multipage teletext decoder is characterized in that the decoder comprises means for marking page numbers of the transmitted teletext pages. Said cyclic series is then constituted by the marked page numbers. This embodiment is particularly favourable because its operation is not influenced by possibly occurring "gaps" in the transmission cycle. In fact, the cyclic series now comprises the page numbers of the actually existing pages. In this case the page numbers skipped in the series represent the pages which have been transmitted within the "dead time" and can thus no longer be captured within the same cycle. It is to be noted that it is known per se from Patent Applications DE 36 22 308 A1 and EP 0 406 972 A1 to provide a teletext decoder with means for marking the transmitted teletext pages. However, in these known teletext decoders a predetermined number of marked numbers is not skipped to determine the next capturable page.

To ensure that a skipped request number is captured as yet in a later cycle, the control circuit in a further embodiment is adapted to store a storage indication for the request numbers of the stored pages and to select a request number for which no storage indication has been stored yet. If all requested pages have been captured and stored, the storage indications for the purpose of refreshing can be deleted.

A further embodiment of the decoder is characterized in that the decoder comprises means for determining whether the page number of the received page differs from the sequence formed by the cyclic series and for determining the page number of a subsequently received page in that case. The most rapidly capturable next page is then determined, also when an "interrupted sequence" page is received.

If the decoder is provided with a plurality of acquisition circuits, it is sensible if the control circuit is adapted to store a request indication for the request numbers which are applied to the acquisition circuits and to select a request number for which no request indication has been stored yet. When such a teletext decoder is used, it is avoided that two or more acquisition circuits capture one and the same page simultaneously. The desired teletext pages are thus captured as rapidly as possible.

BRIEF DESCRIPTION OF THE DRAWINGS

The invention will be described in greater detail by way of example with reference to the drawings illustrating the invention.

DETAILED DESCRIPTION OF THE PREFERRED EMBODIMENT

Figure 1:
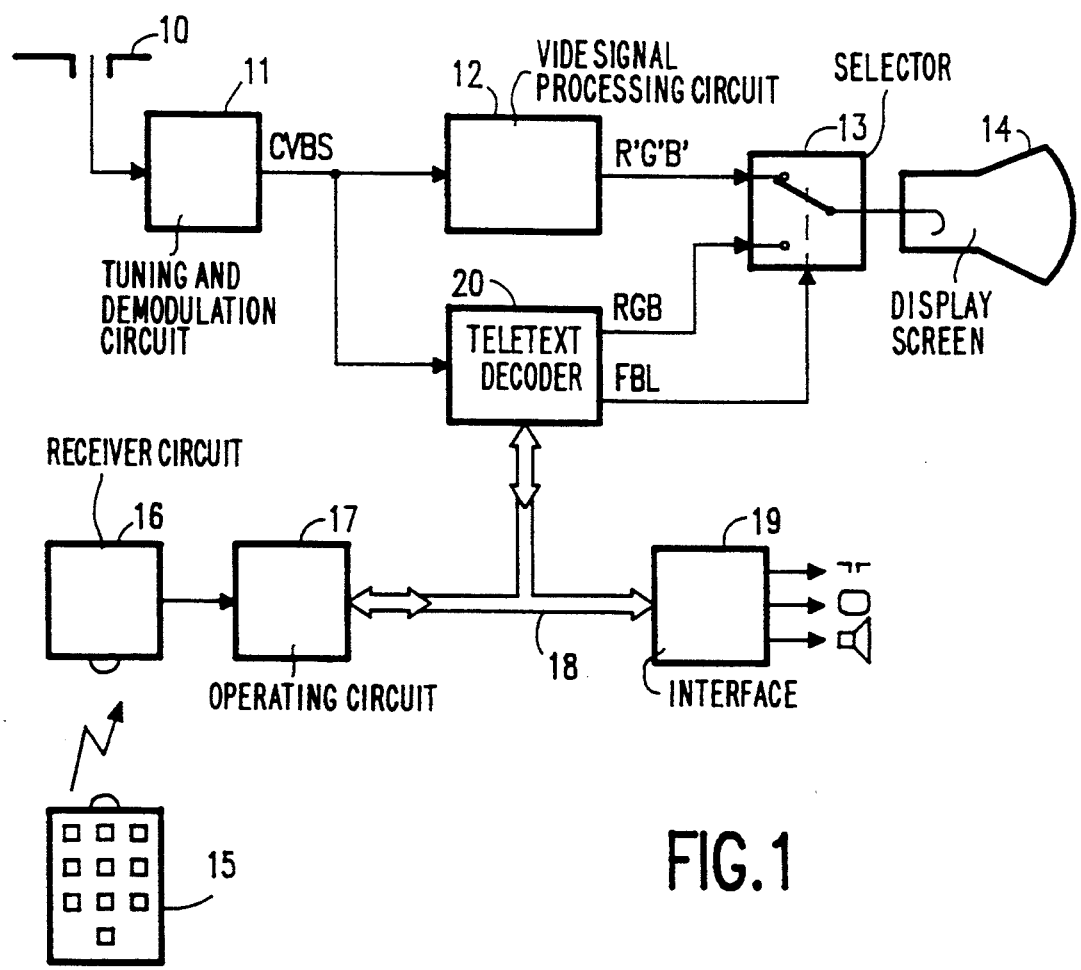
FIG. 1 shows the general structure of a television receiver provided with a multipage teletext decoder according to the invention.

FIG. 1 shows the general structure of a television receiver which is provided with a multipage teletext decoder according to the invention. The television transmitter signals received at an antenna 10 are applied to a tuning and demodulation circuit 11. The obtained composite video signal CVBS of the selected television program is applied to a video signal processing circuit 12 and to a multipage teletext decoder 20. In a normal television operating state of the receiver the elementary colour signals R'G'B' from video signal processing circuit 12 are applied to a display screen 14 via a selector 13, enabling the user to watch the received television program. In a teletext operating state which can be called by the user the elementary colour signals RGB of teletext decoder 20 are displayed on display screen 14 via selector 13. Selector 13 is operated by a blanking signal FBL which is generated in the teletext decoder. Operating instructions given by the user, particularly teletext page numbers, are generated in a (remote) control unit 15 and applied to an operating circuit 17 via a receiver circuit 16. Teletext decoder 20 is connected to this operating circuit 17 by means of a command bus 18 and thus receives the page number of a desired teletext page. An interface 19 is further connected to the command bus, which interface enables the operating circuit 17 to tune the television receiver, to control brightness and volume and the like. This is indicated in the Figure by means of appropriate symbols.

Figure 2:
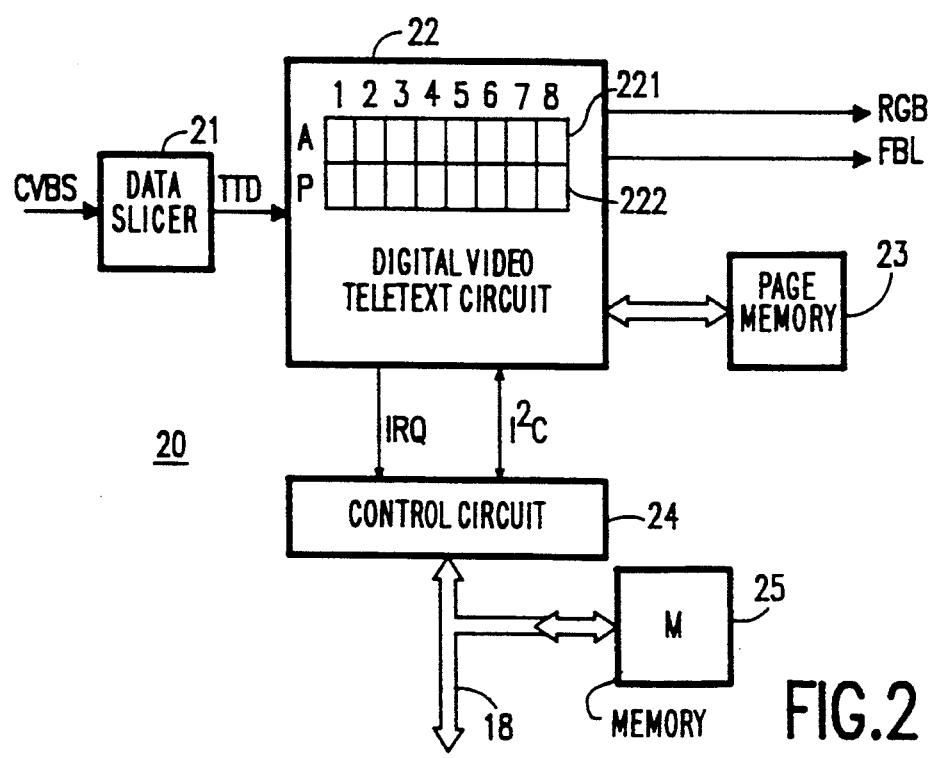
FIG. 2 shows diagrammatically the structure of the multipage teletext decoder shown in FIG. 1.

FIG. 2 shows diagrammatically the structure of teletext decoder 20. The received composite video signal CVBS is applied to a data slicer 21 which is constituted, for example, by the integrated circuit SAA5191 of Philips. The data slicer extracts a teletext data signal TTD from the television lines with teletext information and applies this signal to a digital video teletext (DVT) circuit 22 which is constituted, for example, by the integrated circuit SAA9042 of Philips. The DVT is adapted for acquisition, storage and display of a plurality of teletext pages. To this end, the DVT is coupled to a page memory 23, for example a 128 kbyte DRAM. This memory can be considered to be divided into 64 segments of 2 kbyte each being suitable for storing a teletext page. The DVT is coupled via an I²C bus to a control circuit 24 which is formed, for example by a microprocessor of the type MAB8084 of Philips.

The DVT 22 comprises eight acquisition circuits each being adapted to capture a teletext page with a supplied request number in an autonomic manner and to store this page in a selected segment of the page memory 23. An acquisition register 221 for storing the request number of the teletext page which is to be captured by the relevant acquisition circuit is associated with each acquisition circuit. These acquisition registers will hereinafter be denoted by A(i), i=1 ... 8. Moreover, a pointer register 222 indicating in which segments of the page memory the requested page must be stored upon reception is associated with each acquisition circuit. These pointer registers will hereinafter be denoted by P(i), i=1 ... 8. The registers A(i) and P(i) are accessible to the control circuit 24 v/a the I²C bus. The acquisition circuit is also adapted to apply an interrupt signal IRQ to the control circuit 24 when a requested page has been received and stored. Furthermore, the DVT 22 comprises a display circuit which is adapted to convert a stored page into the displayable signals RGB and the blanking signal FBL.

A memory M (25) is coupled to the communication bus 18 for storing, inter alia, a plurality of request numbers. It will hereinafter be assumed that the user has programmed the memory M with the page numbers of a large number of preferred pages. In practice, the memory will comprise different page numbers for different TV transmitters. The memory is preferably of the non-volatile type so that the stored request numbers are also preserved after the television receiver is switched off.

The operation of the teletext decoder is based on a control program which is performed by the control circuit 24. The control program comprises a storage program for capturing and storing the requested teletext pages and a display program for displaying a page indicated by the user. The display program is performed in the teletext operating mode. It is generally known and will not be further explained. The storage program is continuously performed in the television operating mode as well as the teletext operating mode.

Figure 3A:
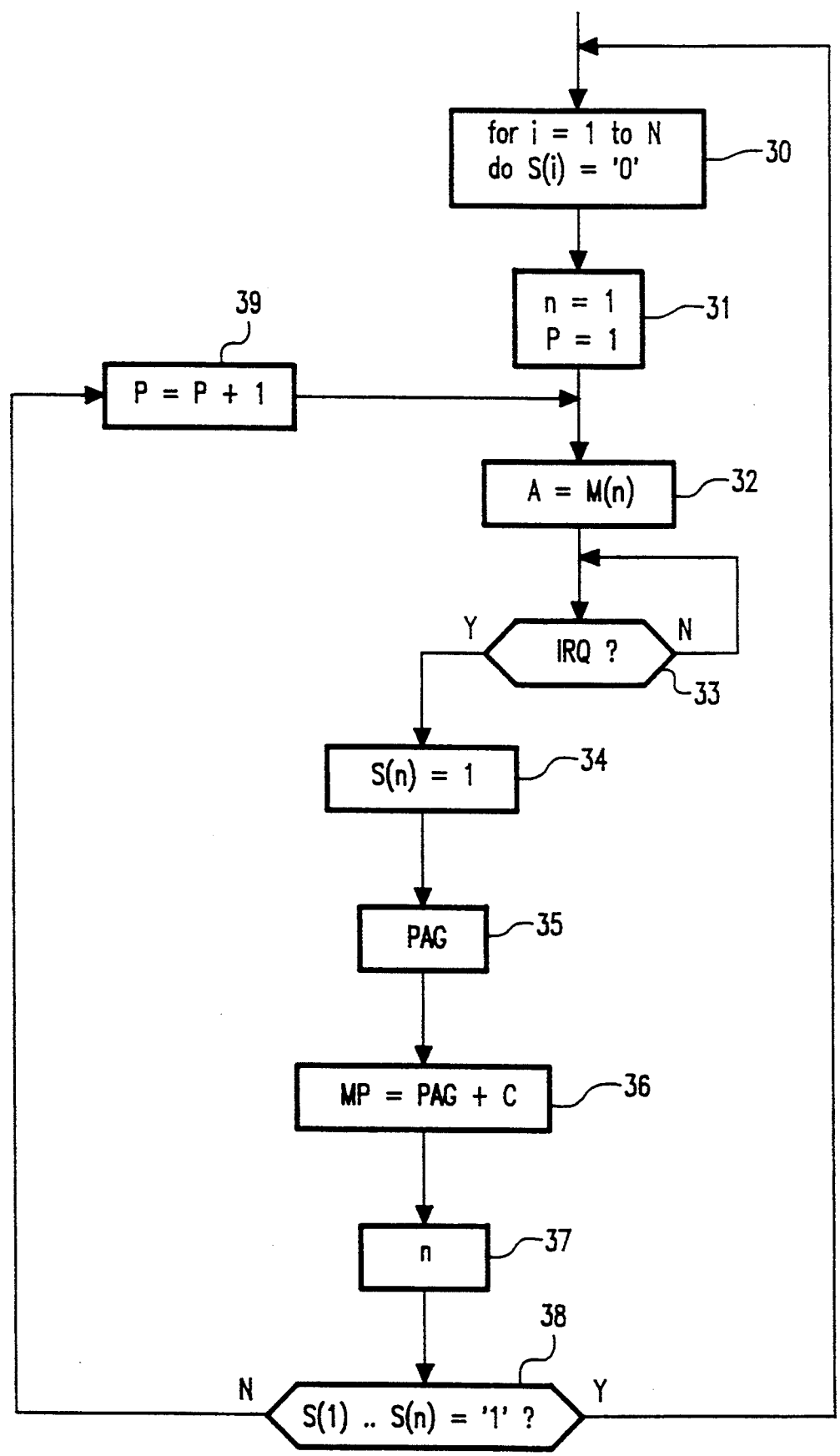
FIGS. 3A and 3B show flow charts of examples of a control program performed by a control circuit shown in FIG. 2.

FIG. 3A shows the flow chart of a first example of the storage program. For this example it will be assumed that the multipage teletext decoder comprises only one acquisition circuit. The request numbers corresponding to a selected transmitter are assumed to be stored at memory locations M(n), n=1 ... N, of the memory M. It will be further assumed that a storage indication S(n) is associated with each memory location, indicating by means of the logic value "0" that the corresponding teletext page has not yet been captured and stored.

The storage program is started after the user has tuned to a transmitter. In an initial step 30 of the storage program the storage indications S(1) ... S(N) are deleted. In a step 31 an index n of the value 1 is initiated. In this step the pointer register P with the initial value 1 is also loaded. This means that a teletext page captured by the acquisition register will be stored in the first segment of the page memory. In a step 32 the request number stored at memory location M(n) is copied in the acquisition register A. The acquisition circuit now ensures autonomically that the teletext page with the first request number is captured and stored in the page memory. In a step 33 a waiting time is observed for the occurrence of an interrupt request signal IRQ which indicates that the page has been received. A maximum waiting time may be observed if it appears that the page is not transmitted. In a step 34 the logic value "1" is assigned to the corresponding storage indication S(n) so as to indicate that the relevant teletext page has been stored.

In a step 35 the current page number PAG is determined. The current page number is formed by the request number M(n) of the page which has just been stored. Subsequently, a lower limit number is fixed in a step 36. This lower limit number forms the minimum page number MP of the next page to be captured. The minimum page number is obtained by skipping a predetermined plurality of numbers in the cyclic series of the teletext page numbers 100–899. In this embodiment this is achieved by adding a predetermined value C to the current page number PAG. Subsequently, the index n of the request number which is the first to succeed is searched in memory M in a step 37. The request numbers of pages which have already been stored are hereby ignored. The step 37 may be realised in different manners. If the request numbers in memory M are arranged in accordance with an ascending enumeration, the step comprises a program loop for searching the next location n in memory M with a higher request number than the minimum page number MP. In pseudo-programming language notation such a program loop is, for example:

do n=n+1
until M(n)≧MP and S(n)="0";

If the request numbers are not arranged, the step comprises a program loop for searching the smallest difference (DIF) between the request numbers M(i), i=1 ... N, and the minimum page number MP. Such a program loop may be:

for i=1 to N do
if M(i)−MP<DIF and S(i)="0"
then DIF=M(i)−MP; n=i;

In both cases the program loop is left within the index n of the memory M in which the request number M(n) is stored which is the first to numerically succeed the lower limit number MP and for which the storage indication still has the value of "0".

In a step 38 of the storage program it is ascertained whether all storage indications S(i), i=1 ... N have the logic value "1". If this is not the case, the storage program returns to the step 32 in which the request number M(n) just found is applied to the acquisition circuit. In a step 39 the pointer register P is raised by 1 so that the requested page will be stored in a subsequent segment of the page memory. If it has been ascertained in the step 38 that all desired pages are stored, the storage program returns to the initial step 30. The entire storage program is then performed again in order to refresh pages which have already been stored.

For the sake of completeness it is to be noted that teletext page numbers are in the range between 100 and 899. Where arithmetical operations such as addition and comparison are concerned in the foregoing, cyclic operations are performed within said range. Thus it holds that, for example, 899+1=100.

The value of C is determined experimentally. A significant aspect is the time required to perform the successive steps 34–39 and 32 after a page has been received. More specifically, searching the next request number in memory M and applying it to the acquisition circuit through the relatively slow $I^2C$ bus are time-consuming operations in practical embodiments of the teletext decoder. Experiments have shown that approximately 4 teletext pages may have passed during this time. The constant C then has an optimum value C=5. However, also considerably higher values of C are effective because it is at least avoided that a page is requested which is no longer capturable in the same cycle.

The foregoing will now be illustrated with reference to a practical example. In this example the multipage teletext decoder is considered to capture and store pages 110–120. The constant C has the value of 5. After page 110 has been received, page 115 is requested. This page is still received in the same cycle. The same applies to the page 120 which is the next to be requested. In the second cycle the decoder receives the pages 111 and 116. As is shown in the following Table, the desired pages are captured and stored in 5 cycli. If the pages had been requested in the usual sequence 110, 111,112, etc., capturing would have taken 11 cycli.

| | 110 | 111 | 112 | 113 | 114 | 115 | 116 | 117 | 118 | 119 | 120 |
|---|---|---|---|---|---|---|---|---|---|---|---|
| 1 | x | | | | | x | | | | | x |
| 2 | | x | | | | | x | | | | |
| 3 | | | x | | | | | x | | | | |
| 4 | | | | x | | | | | | x | | |
| 5 | | | | | x | | | | | | | |

In the step 35 of the storage program described the current page number PAG is constituted by the page number of a page which has just been received. This received page may appear to be an "interrupted sequence" page. This is a page which is transmitted at an arbitrary location in the cycle and whose number differs from the numerical sequence upon reception. If the constant C is added, the next request number is no longer the next capturable page which is the earliest page to be expected.

Figure 3B:
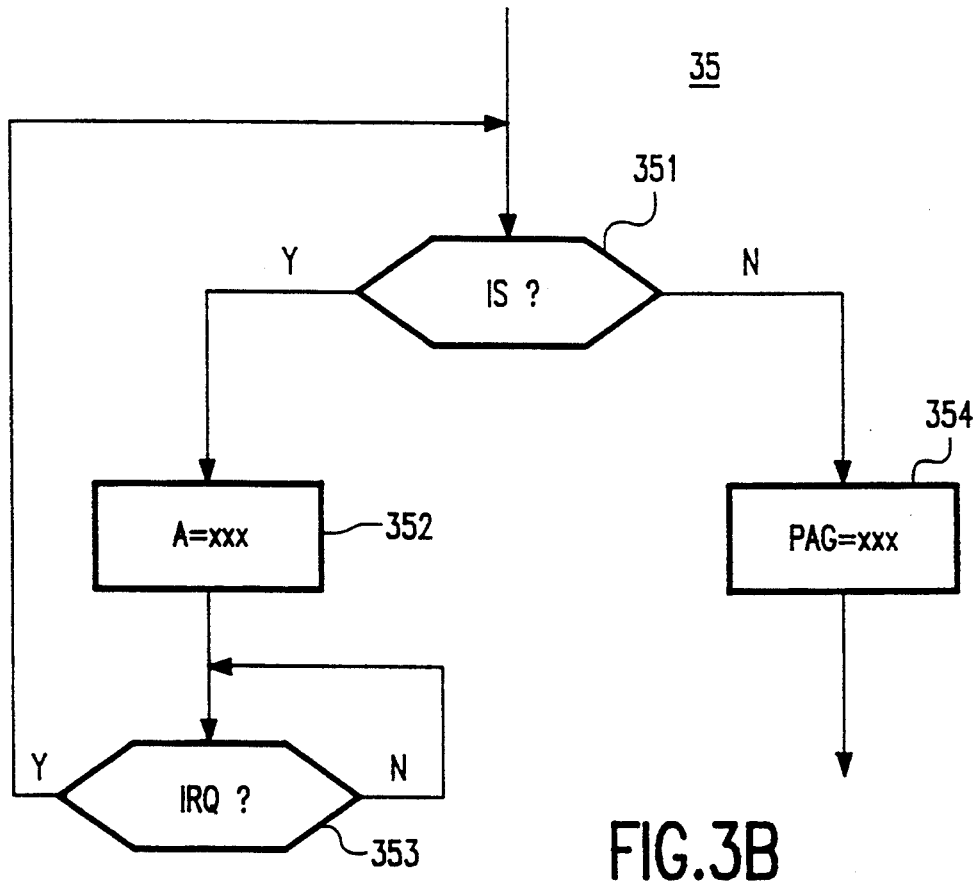

FIG. 3B shows a possible example of the program step 35 with which this inconvenience is prevented. The step 35 now comprises a sub-step 351 in which it is ascertained whether the received page is an "interrupted sequence" page. In practice, "interrupted sequence" pages are provided with an appropriate bit by the transmitter so that sub-step 351 comprises the interpretation of this bit. If the page appears to be an "interrupted sequence" page, a "don't care" page number xxx is applied to the acquisition circuit in a sub-step 352. In a sub-step 353 a waiting time is observed for the reception of this arbitrary page. This will be an extremely short waiting time. Subsequently, it is ascertained whether the arbitrary page is also an "interrupted sequence" page. As soon as a "normal" page has been received, its page number is read in a sub-step 354 and considered as the current page number PAC. Requesting and receiving a "don't care" page takes some extra time. It is sensible to adapt the constant C temporarily to this extra time.

Figure 4:
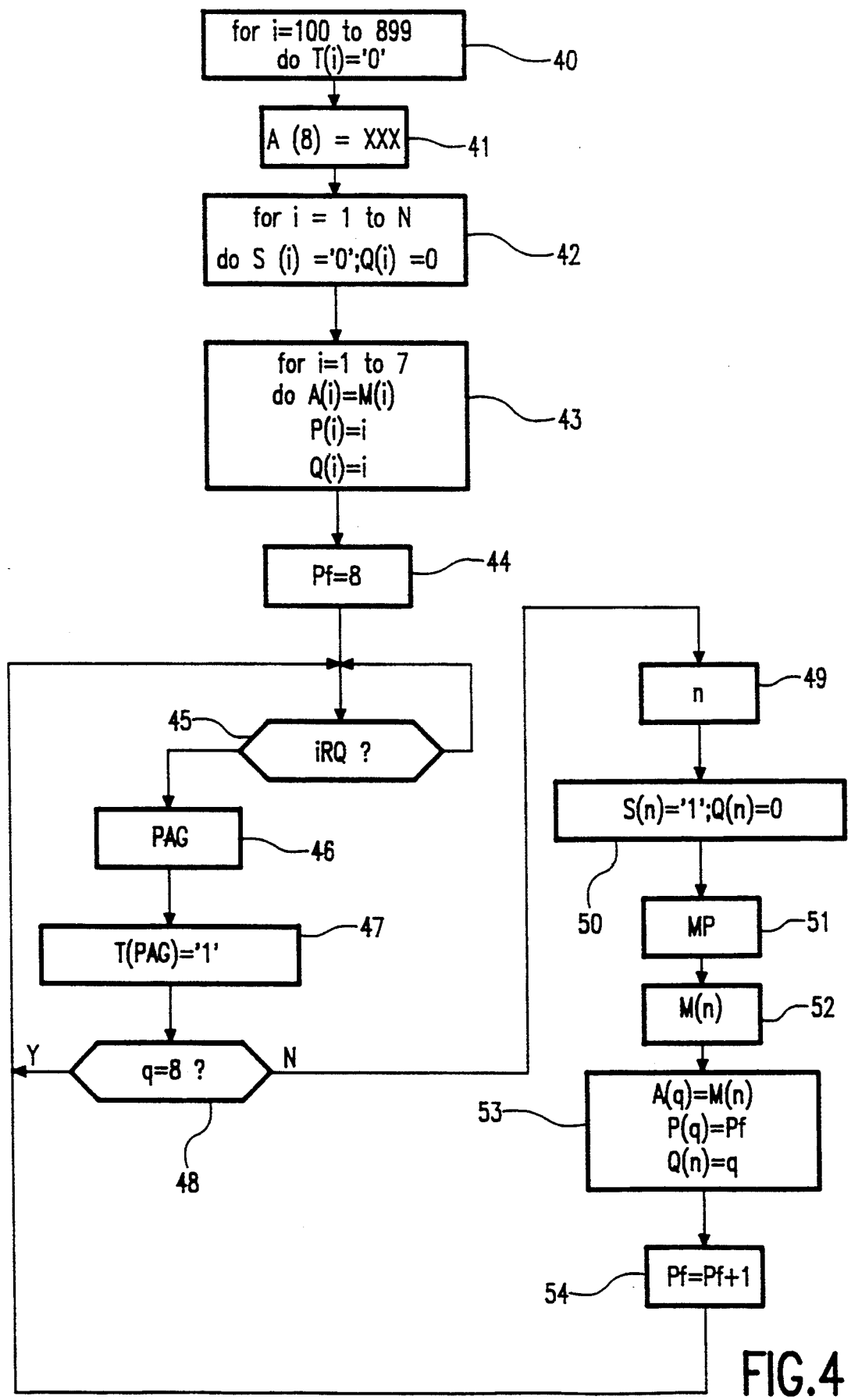
FIG. 4 shows a flow chart of still a further embodiment of a control program performed by the control circuit of FIG. 2.

FIG. 4 shows the flow chart of a further example of the storage program performed by the control circuit. This example is different from the foregoing in that the control circuit marks the page numbers of the teletext pages which are actually transmitted by the transmitter. Moreover, in this example a plurality of acquisition circuits is used for capturing and storing the desired pages.

Figure 5A:
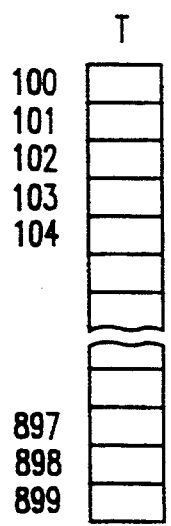
FIG. 5A and 5B show possible forms of memories used in the teletext decoder.

In a step 40 of this storage program all table positions T(i), i=100 ... 899, of a transmission table T are deleted. In FIG. 5A this transmission table is shown diagrammatically. The table T is formed, for example by an 800-bit RAM which forms part of the microprocessor 24 (see FIG. 2). In this case the meaning of the logic value T(i)="0" obtained during deletion is that the teletext page with number i is not present in the transmission. Of the eight available acquisition circuits, the eighth is to fix the transmitted page numbers. To this end, a "don't care" page number xxx is applied to the corresponding acquisition register A(8) in a step 41.

Figure 5B:
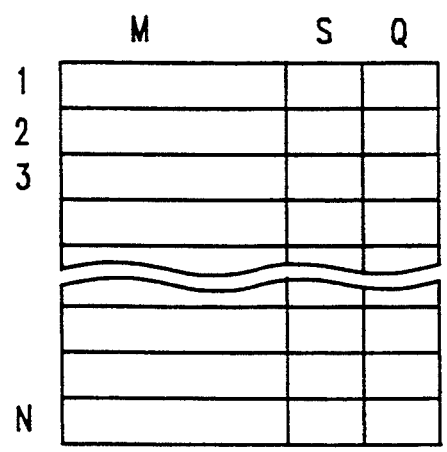

In addition to the storage indication S(i) already referred to, the memory M comprises a request indication Q(i) for each request number M(i), as is shown in FIG. 5B. It is thereby indicated whether, and which of the seven still available acquisition circuits acquires the page M(i). Q(i) may assume the values 0 ... 7. The value 0 indicates that the page M(i) is not acquired, the values 1 ... 7 correspond to the number of the acquisition circuit to which the request number M(i) is applied.

In a step 42 all storage indications S(i) are deleted so as to indicate that no pages have been stored yet. Moreover, all request indications Q(i) are set to 0 so as to indicate that the seven acquisition circuits are not yet capturing pages. In a step 43 the request numbers M(1) ... M(7) are subsequently applied to the seven acquisition circuits. The corresponding pointer registers P(1) ... P(7) each acquire a different initial value in order that the seven requested pages will be stored in different segments of the page memory. The request indications Q(1) ... Q(7) receive the number from the corresponding acquisition circuit. In a step 44 a variable Pf receives the number 8 of the next free segment.

In a step 45 a waiting time is observed for the reception of a page by one of the eight acquisition circuits. In a step 46 the page number of the received page is fixed and assigned to a variable PAG. In a step 47 the logic value "1" is written at the corresponding position T(PAG) of the transmission table so as to indicate that the teletext page having the number PAG is actually present in the transmission.

Subsequently, it is ascertained in a step 48 which of the acquisition circuits has captured the page. The number of the relevant circuit is denoted by q in this case. If it is ascertained in the step 48 that the page has been received by the eighth acquisition circuit, then a "don't care" page has been received and the storage program returns to the step 45 so as to wait for the reception of a subsequent page. In this way the numbers of all teletext pages present in the transmission are marked by the value "1" in the transmission table T.

If it has been determined in the step 48 that the page has been received by one of the seven other acquisition circuits, then one of the requested pages has been received. This page is stored in an autonomic manner in the segment of the page memory allocated by pointer register P(q). In a step 49 the memory location n with the request number of the page just found is searched in memory M. The step 49 is then, for example as follows:
n=0;
do n=n+1 until Q(n)=q; In a step 50 the storage indication S(n) receives the logic value "1" so as to indicate that the corresponding page M(n) has been stored. Request indication Q(n) also receives the value 0 so as to indicate that this page is no longer captured instantaneously.

In a step 51 the page number of the next capturable page is fixed. To this end, a predetermined number of marked positions is skipped in the transmission table T as from the table position of the current page number. Marked positions are understood to mean the table positions having the logic value "1" which correspond to actually transmitted teletext pages. In this way the numbers of teletext pages which have not been transmitted are automatically ignored. This is in contrast to the previous example in which a constant C was added to the current page number. Consequently, the effectivity is not influenced by possible "gaps" in the transmitted page numbers. In pseudo-programming language notation step 51 may be as follows:
for i=1 to C do
do PAG=PAG+1 until T(PAG)="1";
Here the constant C is representative again of the number of pages which is not capturable during a predetermined time after reception of a page. At the start of the program loop PAG represents the current page number. Subsequently, the next marked table position is searched C times. Upon leaving the loop, PAG represents the number of the next capturable page, also referred to as the minimum page number MP.

In a step 52 the request number which is equal to or larger than the minimum page number is subsequently searched in the memory M as from memory location n at which the current page number is stored. Assuming that the request numbers in memory M are arranged in a numerical order, step 52 is as follows:
do n=n+1
until M(n)≧PAG and S(n)="0" and Q(n)=0;
Here it is avoided that a page which has already been stored is requested (the storage indication S(n) then has the logic value "1") or which has already been captured by one of the other acquisition circuits (the request indication Q(n) then has a value unequal to 0).

In a step 53 the page number M(n) found is applied to the free acquisition circuit q. Moreover, the number Pf of the next free segment of the page number is assigned to the corresponding pointer register P(q). The new page request is registered in request indication Q(n). In a step 54 the number Pf of the next free memory segment is raised by 1. Subsequently the storage program returns to the step 45 in which a waiting time is observed for the next reception of a page. The flow chart of FIG. 4 does not show the program steps for testing whether all pages have already been stored. These steps have been explained in the previous example.

The foregoing will be illustrated with reference to a practical example. It is assumed that the teletext transmission comprises, inter alia, the pages 103–107 and 112–118, with intermediate page numbers 108–111 being absent. It is further assumed that 106, 113 and 116 are request numbers. Of these numbers, page 106 is applied to one of the acquisition circuits. Pages 113 and 116 have not been requested yet. The constant C has the value of 5. If page 106 is received, the step 51 of the storage program indicates that page 115 is the next capturable page. In fact, in accordance with the transmission table T, the pages 107, 112, 113, 114, 115, ... are transmitted after page 106, of which pages step 51 searches the fifth. The first request number which qualifies is now 116 and the acquisition of the page 113 which has also been requested is postponed.

For comparison: in the previous example page 113 would have been requested as being the first suitable request number larger than or equal to 106+C=111. However, page 113 is no longer capturable in the same cycle. In the previous example it is therefore advisable to take possible "gaps" in the transmission into account when fixing the constant C.

It has been assumed in the foregoing that the teletext pages are transmitted in an ascending numerical sequence. This is substantially always the case in practice. The sequence is only interrupted by the "interrupted sequence" pages which sometimes occur. However, it is to be noted that it is possible to implement the transmission table in the form of a memory in which the page numbers of all transmitted pages are stored in the transmitted sequence. The request numbers are then also arranged in that sequence. The determination of the next capturable page is then independent of the transmission sequence within a cycle.

I claim:

1. A multipage teletext decoder for capturing and storing a plurality of teletext pages, comprising:
   a page memory for storing the teletext pages;
   at least one acquisition circuit for capturing and storing a teletext page with a supplied request number;
   means for fixing a plurality of request numbers of pages to be captured; and
   a control circuit for applying a request number to the acquisition circuit and for skipping a predetermined number of page numbers after the number of a received page in a predetermined cyclic series of page numbers to select that request number of the plurality of request numbers which is the first to succeed the skipped page numbers in the cyclic series.

2. A decoder as claimed in claim 1, wherein the decoder comprises means for marking page numbers of the transmitted teletext pages, said cyclic series being constituted by the marked page numbers.

3. A decoder as claimed in claim 1, wherein the control circuit is adapted to store a storage indication for the request numbers of the stored pages and to select a request number for which no storage indication has been stored yet.

4. A decoder as claimed in claim 1, wherein the decoder comprises means for determining whether the page number of the received page differs from the sequence formed by the cyclic series and for determining the page number of a subsequently received page in that case.

5. A decoder as claimed in claim 1, comprising a plurality of acquisition circuits, wherein the control circuit is adapted to store a request indication for the request numbers which are applied to the acquisition circuits and to select a request number for which no request indication has been stored yet.

6. A receiver of television signals, provided with a multipage teletext decoder as claimed in claim 1.

7. A decoder as claimed in claim 2, wherein the control circuit is adapted to store a storage indication for the request numbers of the stored pages and to select a request number for which no storage indication has been stored yet.

8. A decoder as claimed in claim 2, wherein the decoder comprises means for determining whether the page number of the received page differs from the sequence formed by the cyclic series and for determined the page number of a subsequently received page in that case.

9. A decoder as claimed in claim 3, wherein the decoder comprises means for determining whether the page number of the received page differs from the sequence formed by the cyclic series and for determined the page number of a subsequently received page in that case.

10. A decoder as claimed in claim 2 comprising a plurality of acquisition circuits, wherein the control circuit is adapted to store a request indication for the request numbers which are applied to the acquisition circuits and to select a request number for which no request indication has been stored yet.

* * * * *